(12) United States Patent
Taniyama et al.

(10) Patent No.: US 11,305,518 B2
(45) Date of Patent: Apr. 19, 2022

(54) LAMINATE

(71) Applicant: ZEON CORPORATION, Tokyo (JP)

(72) Inventors: Tomoya Taniyama, Tokyo (JP);
Kentaro Hayasaka, Tokyo (JP); Shinji Kato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/476,795

(22) PCT Filed: Jan. 12, 2018

(86) PCT No.: PCT/JP2018/000694
§ 371 (c)(1),
(2) Date: Jul. 9, 2019

(87) PCT Pub. No.: WO2018/131687
PCT Pub. Date: Jul. 19, 2018

(65) Prior Publication Data
US 2019/0375199 A1  Dec. 12, 2019

(30) Foreign Application Priority Data

Jan. 13, 2017  (JP) .............................. JP2017-004131

(51) Int. Cl.
*B32B 25/10* (2006.01)
*B32B 5/02* (2006.01)
(Continued)

(52) U.S. Cl.
CPC .......... *B32B 25/10* (2013.01); *A41D 19/0006* (2013.01); *B32B 5/02* (2013.01);
(Continued)

(58) Field of Classification Search
CPC .......... B32B 25/10; B32B 5/02; B32B 25/14; B32B 37/24; B32B 2037/243;
(Continued)

(56) References Cited

U.S. PATENT DOCUMENTS 3,620,811 A * 11/1971 Morrissey ............ D06N 3/0086
428/904
2003/0075828 A1  4/2003 Thomas et al.
(Continued)

FOREIGN PATENT DOCUMENTS

AU  2009230758 B2  3/2014
JP  S55-163202 A  12/1980
(Continued)

OTHER PUBLICATIONS

Satoshi et al. (JP S55-163202 A); Dec. 19, 1980 (EPO—Machine Translation to English). (Year: 1980).*
(Continued)

*Primary Examiner* — Frank J Vineis
*Assistant Examiner* — Donald M Flores, Jr.
(74) *Attorney, Agent, or Firm* — Oliff PLC

(57) ABSTRACT

A laminated body formed by laminating a fiber substrate composed of a plurality of fibers and a polymer layer formed from a polymer latex. The polymer layer covers the fiber substrate in a state in which a portion of the polymer layer has permeated among the fibers. A ratio ($t_1/d$) of a thickness $t_1$ of the portion of the polymer layer that has permeated among the fibers (from a top surface of the fiber substrate) to a substrate layer average thickness d is 0.1 to 0.95. A thickness $t_2$ of the portion of the polymer layer covering the top surface of the fiber substrate (from the top surface of the fiber substrate) is 80 μm or more.

16 Claims, 1 Drawing Sheet

(51) Int. Cl.
*B32B 25/14* (2006.01)
*B32B 37/24* (2006.01)
*A41D 19/00* (2006.01)

(52) U.S. Cl.
CPC .............. *B32B 25/14* (2013.01); *B32B 37/24* (2013.01); *B32B 2037/243* (2013.01); *B32B 2262/062* (2013.01); *B32B 2270/00* (2013.01); *B32B 2307/51* (2013.01); *B32B 2307/546* (2013.01); *B32B 2310/0418* (2013.01); *B32B 2329/04* (2013.01); *B32B 2333/00* (2013.01); *B32B 2437/02* (2013.01); *B32B 2571/00* (2013.01); *Y10T 428/24967* (2015.01)

(58) Field of Classification Search
CPC .......... B32B 2262/062; B32B 2270/00; B32B 2307/51; B32B 2307/546; B32B 2310/0418; B32B 2329/04; B32B 2333/00; B32B 2437/02; B32B 2571/00; B32B 27/12; A41D 19/0006; A41D 19/0065; A41D 19/015; A41D 19/00; Y10T 428/24967; D06M 11/20; D06M 11/56; D06M 11/57; D06M 11/17; D06M 11/45; D06M 15/333; D06M 15/3562; D06M 15/31; D06M 15/693; D06N 2211/103; D06N 3/10
See application file for complete search history.

(56) References Cited

U.S. PATENT DOCUMENTS

| | | | |
|---|---|---|---|
| 2007/0204381 A1* | 9/2007 | Thompson | B29C 59/02 2/159 |
| 2010/0104750 A1* | 4/2010 | Kassam | B29C 41/14 427/243 |
| 2011/0209504 A1 | 9/2011 | Thompson et al. | |
| 2014/0115750 A1 | 5/2014 | Kassam et al. | |
| 2018/0186128 A1* | 7/2018 | Kato | D06M 15/263 |

FOREIGN PATENT DOCUMENTS

| | | | |
|---|---|---|---|
| JP | S55163202 A | * | 12/1980 |
| JP | H02-118102 A | | 5/1990 |
| JP | 2004-107813 A | | 4/2004 |
| JP | 2004-277471 A | | 10/2004 |
| JP | 2009-527658 A | | 7/2009 |
| JP | 2013-170319 A | | 9/2013 |
| WO | 2009/057524 A1 | | 5/2009 |

OTHER PUBLICATIONS

Apr. 17, 2018 Search Report issued in International Application No. PCT/JP2018/000694.
Jul. 16, 2019 International Preliminary Report on Patentability issued in International Patent Application No. PCT/JP2018/000694.
Jul. 31, 2020 European Search Report Issued in European Patent Application No. 18738939.0.
Jan. 4, 2022 Office Action issued in European Application No. 18 738 939.0.

* cited by examiner

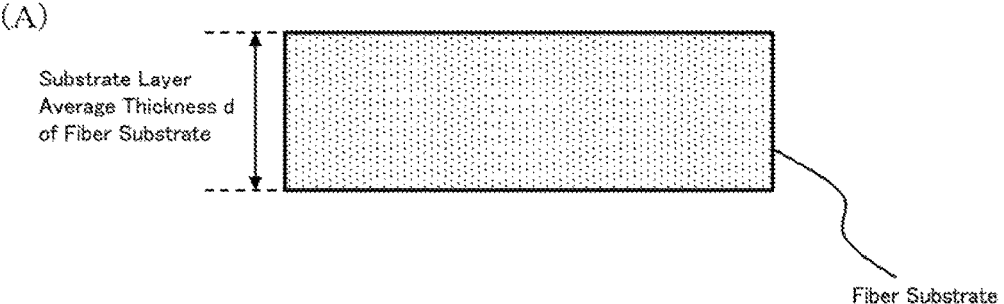
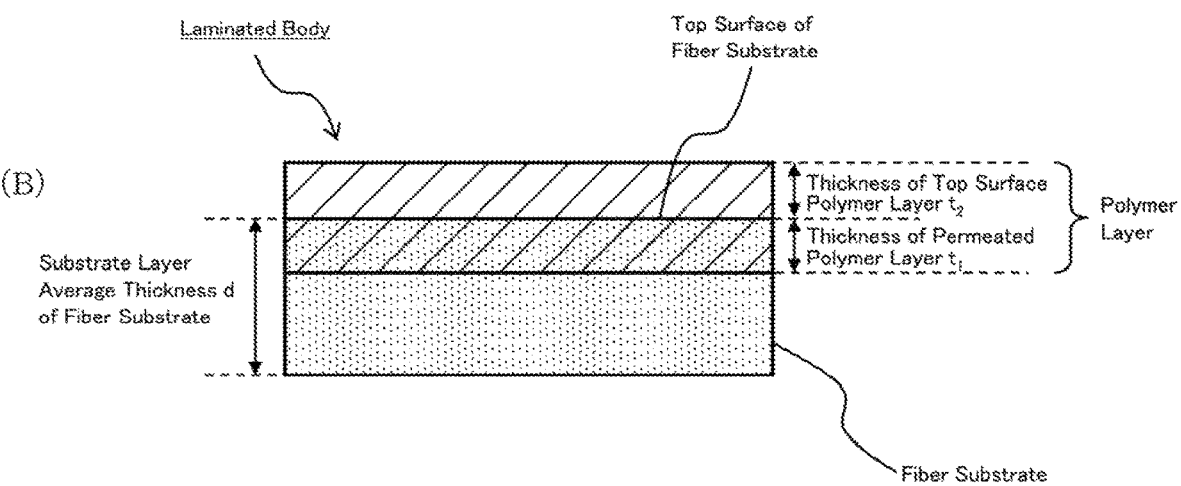

LAMINATE

TECHNICAL FIELD

The present invention relates to a laminated body formed by laminating a fiber substrate composed of a plurality of fibers and a polymer layer formed from a polymer latex. The present invention also relates to a protective glove comprising the laminated body.

BACKGROUND ART

Conventionally, protective gloves whose solvent resistance, grip properties, wear resistance, and the like have been improved by coating fiber gloves with rubber, resin, or the like have been used as work gloves in various applications, such as manufacturing work in factories, light work, construction work, and agricultural work.

As such a protective glove, for example, a protective glove and the like obtained by depositing and forming a film of a rubber or a resin on the outer surface of a fiber glove covering a glove mold is known. However, when depositing the rubber or resin on the fiber glove, the rubber or resin may permeate from the outer surface into the interior of the fiber glove, which can cause the rubber or resin to be deposited on the glove mold, making it difficult to remove the protective glove from the glove mold. As a result, the productivity of the protective glove is reduced and the comfort when the obtained protective glove is worn is also reduced.

In order to solve such problems, for example, Patent Document 1 discloses a protective glove formed by, after impregnating a fiber glove with a coagulant solution in which an acid, a polyvalent metal salt, or the like is dissolved, bringing an emulsion of a rubber or a synthetic resin into contact with the top surface of the glove body to form a thin film, and then forming a coating of a synthetic resin paste on the thin film. However, a protective glove obtained by the technique of Patent Document 1 has a problem in that the thickness and the permeation amount into the fiber glove are not controlled for the thin film formed using the emulsion of a rubber or a synthetic resin, and the flexibility of the protective glove is reduced.

RELATED ART

Patent Document

Patent Document 1: Japanese Patent Laid-Open No. 2-118102

SUMMARY OF THE INVENTION

Problem to be Solved by the Invention

The present invention has been made in view of such circumstances, and it is an object thereof to provide a laminated body having excellent productivity as well as excellent flexibility and comfort when worn. Further, it is also an object of the present invention to provide a protective glove comprising such a laminated body.

Means for Solving the Problem

As a result of diligent research to achieve the above objects, the present inventors have found that the above objects can be achieved by, in a laminated body formed by laminating a fiber substrate composed of a plurality of fibers and a polymer layer formed from a polymer latex, controlling a ratio of the thickness of a portion of the polymer layer permeated among the fibers to the substrate layer average thickness of the fiber substrate to be in a predetermined range, and also controlling, of the polymer layer, the thickness of a portion covering the top surface of the fiber substrate to be in a predetermined range, thereby completing the present invention.

Specifically, according to the present invention, there is provided a laminated body formed by laminating a fiber substrate composed of a plurality of fibers and a polymer layer formed from a polymer latex, wherein the polymer layer covers the fiber substrate in a state in which a portion of the polymer layer has permeated among the fibers; a ratio $(t_1/d)$ of a thickness of a permeated polymer layer $t_1$ to a substrate layer average thickness d is 0.1 to 0.95, where the thickness of the permeated polymer layer of the polymer layer, which is a portion that has permeated among the fibers, from a top surface of the fiber substrate is set to $t_1$ [μm] and a substrate layer average thickness of the fiber substrate is set to d [μm]; and a thickness of a top surface polymer layer $t_2$ [μm] is 80 μm or more, where the thickness of the top surface polymer layer of the polymer layer, which is a portion covering the top surface of the fiber substrate, from the top surface of the fiber substrate is set to $t_2$ [μm].

In the laminated body of the present invention, the polymer latex preferably contains a nonionic water-soluble polymer as a thickener.

In the laminated body of the present invention, a content ratio of the nonionic water-soluble polymer in the polymer latex is preferably 0.1 to 5.0% by weight.

In the laminated body of the present invention, the nonionic water-soluble polymer is preferably a polyvinyl alcohol and/or polyvinyl pyrrolidone.

In the laminated body of the present invention, a polymer constituting the polymer latex is preferably a nitrile rubber.

In the laminated body of the present invention, the nitrile rubber preferably contains an ethylenically unsaturated nitrile monomer unit, a conjugated diene monomer unit, and an ethylenically unsaturated acid monomer unit.

Further, according to the present invention, there is provided a protective glove comprising the above-mentioned laminated body.

In addition, according to the present invention, there is provided a method of producing the above-mentioned laminated body, the method comprising a latex deposition step of depositing the polymer latex on the fiber substrate, and a coagulation step of forming the polymer layer by bringing a coagulant solution into contact with the polymer latex deposited on the fiber substrate to cause a polymer in the polymer latex to coagulate, wherein when depositing the polymer latex on the fiber substrate, the polymer latex is deposited on the fiber substrate in a state in which a viscosity of the polymer latex is controlled in a range of 600 to 25,000 mPa·s, the viscosity being measured by using a B-type viscometer under conditions of a rotational speed of 10 rpm.

In the method of producing the laminated body according to the present invention, when depositing the polymer latex on the fiber substrate, it is preferable to deposit the polymer latex on the fiber substrate in a state in which the viscosity of the polymer latex is controlled to 600 to 25,000 mPa·s, the viscosity being measured by using a B-type viscometer under conditions of a temperature of 25° C., a solid content concentration of 45% by weight, and a rotational speed of 10 rpm.

Effects of Invention

According to the present invention, a laminated body having excellent productivity as well as excellent flexibility and comfort when worn can be provided. Further, according to the present invention, a protective glove comprising such a laminated body can be provided.

BRIEF DESCRIPTION OF DRAWING

FIG. 1 is a schematic diagram of a fiber substrate used in the present invention and of a laminated body of the present invention.

DESCRIPTION OF EMBODIMENTS

A laminated body of the present invention is a laminated body formed by laminating a fiber substrate composed of a plurality of fibers and a polymer layer formed from a polymer latex, wherein the polymer layer covers the fiber substrate in a state in which a portion of the polymer layer has permeated among the fibers; a ratio ($t_1$/d) of a thickness of a permeated polymer layer $t_1$ to a substrate layer average thickness d is 0.1 to 0.95, where the thickness of the permeated polymer layer of the polymer layer, which is a portion that has permeated among the fibers, from a top surface of the fiber substrate is set to $t_1$ [μm] and a substrate layer average thickness of the fiber substrate is set to d [μm]; and a thickness of a top surface polymer layer $t_2$ [μm] is 80 μm or more, where the thickness of the top surface polymer layer of the polymer layer, which is a portion covering the top surface of the fiber substrate, from the top surface of the fiber substrate is set to $t_2$ [μm].

The fiber substrate used in the present invention is not particularly limited as long as it is made of fibers. Examples of fibers constituting the fiber substrate that may be used as a raw material include natural fibers such as cotton, hair, hemp, wool, and the like, and synthetic fibers such as polyester, polyurethane, acrylic, nylon, and the like. Among these, it is preferable to use cotton.

The fibers constituting the fiber substrate used in the present invention may be single fibers (individual fibers extracted one by one from the above-mentioned natural fibers, synthetic fibers, or the like), or a twisted yarn composed of a plurality of single fibers. However, it is preferable for the fibers to be a twisted yarn.

The fiber substrate may be a knitted product or a woven product of the above-mentioned fibers, or may be a non-woven fabric. Further, the fiber substrate may be a sewn substrate.

In the laminated body of the present invention, as described above, the ratio ($t_1$/d) of the thickness of the permeated polymer layer of the polymer layer $t_1$ to the substrate layer average thickness of the fiber substrate d may be in the above range, but it is preferable for the substrate layer average thickness of the fiber substrate d to be 50 to 3,000 μm, more preferably 100 to 2,000 μm, and still more preferably 400 to 900 μm. By setting the substrate layer average thickness d in the above range, the strength of the obtained laminated body can be further improved.

Note that, since the fiber substrate is composed of a plurality of fibers, particularly in the case where the fiber substrate is a woven fabric, there exist, in general, portions where the fibers are folded and the overlapping degree of the fibers in the thickness direction is dense (portion where the number of overlapping fibers is large) and portions where the overlapping degree of the fibers in the thickness direction is sparse (portion where the number of overlapping fibers is small), and hence the fiber substrate is composed of a layer (substrate layer) including these portions. Therefore, in the microstructure of the fiber substrate, the thickness of the fiber substrate may be different in the portions where the overlapping degree of the fibers is dense and the portions where the overlapping degree of the fibers is sparse. However, in the present invention, the substrate layer average thickness of the fiber substrate d is determined as the average value when the thickness of the portion where the overlapping degree of the fibers is dense is regarded as the thickness of the fiber substrate. More specifically, the thickness of the portion where the overlapping degree of the fibers is dense is taken as the substrate layer average thickness d of the fiber substrate.

The linear density of the fibers constituting the fiber substrate is not particularly limited, but is preferably 50 to 500 denier.

The gauge number of the fiber substrate is not particularly limited, but from the viewpoint of enabling the part of the polymer layer to be allowed to more appropriately permeate by the fiber substrate (when forming the polymer layer on the fiber substrate, of the polymer layer to be formed, enabling the thickness of the permeated polymer layer $t_1$ to be controlled to a more appropriate range), is preferably 7 to 18 gauge. Here, the gauge number refers to the number of needles in the knitting machine per inch.

The laminated body of the present invention can be obtained by, for example, after depositing a polymer latex to be described later on such a fiber substrate, forming the polymer layer by bringing a coagulant solution into contact with the polymer latex deposited on the fiber substrate to coagulate the polymer in the polymer latex. At this stage, the polymer layer is formed so as to cover the fiber substrate in a state in which a portion of the polymer layer has permeated into the fiber substrate.

The polymer latex used in the present invention is not particularly limited, but from the viewpoint that the obtained laminated body can have superior flexibility, it is preferable to use a polymer containing a rubbery polymer. Examples of the rubbery polymer include: natural rubber; a conjugated diene type rubber obtained by polymerizing or copolymerizing a conjugated diene, such as butadiene or isoprene; and the like. Among these, a conjugated diene type rubber is preferable. Examples of conjugated diene rubbers include a so-called nitrile rubber obtained by copolymerizing nitrile, isoprene rubber, styrene-butadiene rubber, chloroprene rubber, and the like, among which a nitrile rubber is particularly preferable.

The nitrile rubber is not particularly limited, but a copolymer obtained by copolymerizing an α,β-ethylenically unsaturated nitrile monomer and the other optionally-used copolymerizable monomer can be used.

The α,β-ethylenically unsaturated nitrile monomer is not particularly limited, but an ethylenically unsaturated compound having a nitrile group and preferably 3 to 18 carbon atoms can be used. Examples of such an α,β-ethylenically unsaturated nitrile monomer include acrylonitrile, methacrylonitrile, a halogen-substituted acrylonitrile, and the like. Among these, acrylonitrile is particularly preferable. Note that, these α,β-ethylenically unsaturated nitrile monomers may be used singly or in combinations of two or more.

The content ratio of the α,β-ethylenically unsaturated nitrile monomer unit in the nitrile rubber is preferably 10 to 45% by weight, and more preferably 20 to 40% by weight, based on all monomer units. When the content ratio of the α,β-ethylenically unsaturated nitrile monomer unit is in the above range, the solvent resistance of the obtained laminated body can be improved and texture can be improved.

Further, from the viewpoint of imparting rubber elasticity to the obtained polymer layer, the nitrile rubber preferably contains a conjugated diene monomer unit.

The conjugated diene monomer forming the conjugated diene monomer unit is preferably a conjugated diene monomer having 4 to 6 carbon atoms, such as 1,3-butadiene, isoprene, 2,3-dimethyl-1,3-butadiene, 1,3-pentadiene, and chloroprene; 1,3-butadiene and isoprene are more preferable; and 1,3-butadiene is particularly preferable. These conjugated diene monomers may be used singly or in combinations of two or more.

The content ratio of the conjugated diene monomer unit is preferably 40 to 80% by weight, and more preferably 52 to 78% by weight, based on all monomer units constituting the nitrile rubber. When the content ratio of the conjugated diene monomer unit is in the above range, the solvent resistance of the obtained laminated body can be improved and the texture of the obtained laminated body when used as a protective glove can be improved.

Further, the nitrile rubber may include a monomer forming an α,β-ethylenically unsaturated nitrile monomer unit and the other ethylenically unsaturated acid monomers copolymerizable with a monomer forming a conjugated diene monomer unit.

Examples of such other copolymerizable ethylenically unsaturated acid monomers include, but are not particularly limited to, a carboxyl group-containing ethylenically unsaturated monomer, a sulfonic acid group-containing ethylenically unsaturated monomer, a phosphoric acid group-containing ethylenically unsaturated monomer, and the like.

Examples of the carboxyl group-containing ethylenically unsaturated monomer include, but are not particularly limited to, ethylenically unsaturated monocarboxylic acids such as acrylic acid, methacrylic acid, and crotonic acid; ethylenically unsaturated polyvalent carboxylic acids, and anhydrides thereof, such as fumaric acid, maleic acid, itaconic acid, maleic anhydride, itaconic anhydride; partially esterified products of ethylenically unsaturated polyvalent carboxylic acids, such as methyl maleate and methyl itaconate; and the like.

Examples of the sulfonic acid group-containing ethylenically unsaturated monomer include, but are not particularly limited to, vinylsulfonic acid, methylvinylsulfonic acid, styrenesulfonic acid, (meth)allylsulfonic acid, ethyl (meth)acrylate-2-sulfonate, 2-acrylamide-2-hydroxypropanesulfonic acid, and the like.

Examples of the phosphoric acid group-containing ethylenically unsaturated monomer include, but are not particularly limited to, propyl (meth)acrylate-3-chloro-2-phosphate, ethyl (meth)acrylate-2-phosphate, 3-allyloxy-2-hydroxypropane phosphoric acid, and the like.

These other copolymerizable ethylenically unsaturated acid monomers may be used as alkali metal salt or an ammonium salt, and may be used singly or in combinations of two or more. Among the other copolymerizable ethylenically unsaturated acid monomers, a carboxyl group-containing ethylenically unsaturated monomer is preferable, an ethylenically unsaturated monocarboxylic acid is more preferable, and methacrylic acid is particularly preferable.

The content of the other copolymerizable ethylenically unsaturated acid monomer in the polymer constituting the polymer latex used in the present invention is preferably 2 to 8% by weight based on all monomer units in the polymer. Setting the content of the other copolymerizable ethylenically unsaturated acid monomer unit to be in the above range enables the moldability of the polymer layer to be formed on the fiber substrate to be superior, and the texture when the obtained laminated body is used as a protective glove can be improved.

In addition to the above-mentioned ethylenically unsaturated nitrile monomer unit, conjugated diene monomer unit, and the other copolymerizable ethylenically unsaturated acid monomer unit, the polymer constituting the polymer latex may further contain other monomer unit.

Other monomers forming the other monomer unit may be any monomer that is copolymerizable with the conjugated diene monomer, the ethylenically unsaturated nitrile monomer unit, and the ethylenically unsaturated acid monomer. Examples thereof include, but are not particularly limited to, the following monomers.

Specifically, examples of the other monomer may include: aromatic vinyl monomers such as styrene, α-methylstyrene, monochlorostyrene, dichlorostyrene, trichlorostyrene, monomethylstyrene, dimethylstyrene, trimethylstyrene, and hydroxymethylstyrene; ethylenically unsaturated carboxylic acid amide monomers such as acrylamide, methacrylamide, N,N-dimethylacrylamide, and N-methylolacrylamide; ethylenically unsaturated carboxylic acid alkyl ester monomers such as methyl (meth)acrylate, ethyl (meth)acrylate, butyl (meth)acrylate, and 2-ethylhexyl (meth)acrylate; carboxylic acid vinyl ester monomers such as vinyl acetate, vinyl propionate, and vinyl versatate; halogenated vinyl monomers such as vinyl chloride, vinylidene chloride, vinyl fluoride, and vinylidene fluoride; olefin monomers such as ethylene, propylene, 1-butene, and isobutene; vinyl ether monomers such as methyl vinyl ether, n-propyl vinyl ether, isobutyl vinyl ether, and dodecyl vinyl ether; (meth)allyl compounds such as allyl acetate, methallyl acetate, allyl chloride, and methallyl chloride; vinylsilyl compounds such as vinyltrimethoxysilane; vinyl pyridine, N-vinyl pyrrolidone; and the like. Among these, from the viewpoint that the strength of the obtained laminated body can be further increased, aromatic vinyl monomers are preferable. These other monomers may be used singly or in combinations of two or more.

The content of other monomer unit in the polymer constituting the polymer latex is, from the viewpoint of preventing the polymer layer from peeling off from the fiber substrate, from the viewpoint of suppressing work fatigue when used as a work glove, and from the viewpoint of suppressing passage of solvent gas when worn as a work glove, preferably 26% by weight or less, more preferably 10% by weight or less, even more preferably 7% by weight or less, and particularly preferably 5% by weight or less, based on all monomer units in the polymer.

The polymer latex used in the present invention is not particularly limited, and may, for example, be any latex of a polymer obtained by polymerizing a monomer mixture containing the above-mentioned monomers. This polymer latex may be a latex obtained by emulsion polymerization of the above-mentioned monomer mixture, a latex obtained by phase inversion emulsification of a polymer solution obtained by solution polymerization of the above-mentioned monomer mixture, and the like.

In the case of using a latex obtained by emulsion polymerization, by adjusting the composition of the monomer mixture used for the emulsion polymerization, the composition of the obtained copolymer can be easily adjusted. A conventionally known method can be employed as the emulsion polymerization method.

For the emulsion polymerization of the above mixture of monomers, ordinarily used polymerization auxiliary materials, such as an emulsifier, a polymerization initiator, and a molecular weight regulator, can be used. The method of adding these polymerization auxiliary materials is not particularly limited, and any method, such as an initial batch addition method, a split addition method, and a continuous addition method may be used.

Examples of emulsifiers include, but are not limited to, anionic surfactants, nonionic surfactants, cationic surfactants, amphoteric surfactants, and the like. Among these, anionic surfactants such as alkylbenzene sulfonate, an aliphatic sulfonate, a sulfuric acid ester salt of a higher alcohol, an α-olefin sulfonate, and an alkyl ether sulfuric acid ester salt are preferable.

The used amount of the emulsifier is preferably 0.5 to 10 parts by weight, and more preferably 1 to 8 parts by weight, based on 100 parts by weight of all monomers used.

The polymerization initiator is not particularly limited, but a radical initiator is preferable. Examples of the radical initiator include, but are not particularly limited to: inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyrylperoxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexane carbonitrile, and methyl azobisisobutyrate; and the like. Among these, an inorganic peroxide or an organic peroxide is preferable, an inorganic peroxide is more preferable, and persulfate is particularly preferable. These polymerization initiators may be used singly or in combinations of two or more.

The used amount of the polymerization initiator is preferably 0.01 to 2 parts by weight, and more preferably 0.05 to 1.5 parts by weight, based on 100 parts by weight of all monomers used.

Examples of the molecular weight regulator include, but are not limited to, an α-methyl styrene dimer; mercaptans such as t-dodecyl mercaptan, n-dodecyl mercaptan, and octyl mercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropylxanthogen disulfide; and the like. Among these, mercaptans are preferable, and t-dodecylmercaptan is more preferable. These molecular weight regulators may be used singly or in combinations of two or more.

Although the used amount of the molecular weight regulator depends on the kind of molecular weight regulator, it is preferably 0.1 to 1.5 parts by weight, and more preferably 0.2 to 1.0 part by weight, based on 100 parts by weight of all monomers to be used.

Emulsion polymerization is usually carried out in water. The used amount of the water is preferably 80 to 500 parts by weight, and more preferably 100 to 200 parts by weight, based on 100 parts by weight of all monomers to be used.

During emulsion polymerization, optionally, a polymerization auxiliary material other than the above may be further used. Examples of the polymerization auxiliary material include a chelating agent, a dispersant, a pH regulator, a deoxidizing agent, a particle size adjusting agent, and the like. The kind and used amount of those polymerization auxiliary materials are not particularly limited.

Examples of the method of adding the monomers include a method of adding the monomers used in the reaction vessel at a time, a method of continuously or intermittently adding the monomers according to the progress of polymerization, a method in which the reaction is carried out up to a specific conversion rate by adding a part of the monomers and then the remaining monomers are continuously or intermittently added and polymerized, and the like. Any of these methods may be employed. In the case of mixing and adding the monomers continuously or intermittently, the composition of the mixture may be constant or may be changed.

Further, each monomer may be added to the reaction vessel after mixing in advance the various monomers to be used, or may be individually added to the reaction vessel.

The polymerization temperature during emulsion polymerization is not particularly limited, but it is usually 0 to 95° C., and preferably 5 to 70° C. The polymerization time is not particularly limited, but is usually about 5 to 40 hours.

As described above, at the point when the monomers have undergone emulsion polymerization and a predetermined polymerization conversion rate has been reached, the polymerization reaction is stopped by cooling the polymerization system or by adding a polymerization terminator. The polymerization conversion rate at the time of stopping the polymerization reaction is usually 80% by weight or more, and preferably 90% by weight or more.

The polymerization terminator is not particularly limited as long as it is usually used in emulsion polymerization. Specific examples thereof include hydroxyamine compounds such as hydroxylamine, hydroxyamine sulfate, diethylhydroxyamine, and hydroxyamine sulfonic acid and alkali metal salts thereof; sodium dimethyldithiocarbamate; hydroquinone derivatives; catechol derivatives; aromatic hydroxy dithiocarboxylic acids such as hydroxydimethyl benzene thiocarboxylic acid, hydroxydiethyl benzene dithiocarboxylic acid, and hydroxydibutyl benzene dithiocarboxylic acid, and alkali metal salts thereof; and the like.

The used amount of the polymerization terminator is not particularly limited, but is usually 0.05 to 2 parts by weight based on 100 parts by weight of all monomers to be used.

After stopping the polymerization reaction, if desired, unreacted monomers may be removed, and the solid content concentration and pH may be adjusted.

The weight average particle size of the particles of the polymer constituting the polymer latex is usually 30 to 1000 nm, preferably 50 to 500 nm, and more preferably 70 to 200 nm. When the weight average particle size of the particles of the polymer is in the above range, the viscosity of the polymer latex is appropriate, the handleability of the polymer latex more improves, and moldability during molding the polymer layer improves, whereby a laminated body having a more uniform polymer layer is obtained.

The solid content concentration of the polymer latex is usually 20 to 65% by weight, preferably 30 to 60% by weight, and more preferably 35 to 55% by weight. By setting the solid content concentration of the polymer latex to be in the above range, the transport efficiency of the latex can be improved, the viscosity of the polymer latex is appropriate, and the handleability of the polymer latex is improved.

The pH of the polymer latex is usually 5 to 13, preferably 7 to 10, and more preferably 7.5 to 9. By setting the pH of the polymer latex to be in the above range, mechanical stability is improved, the occurrence of coarse aggregates during transfer of the polymer latex can be suppressed, the viscosity of the polymer latex is appropriate, and the handleability of polymer latex improves.

Further, in the polymer latex used in the present invention, a crosslinking agent, a crosslinking accelerator, zinc oxide, and the like can be added. Specifically, the polymer latex used in the present invention may be a polymer latex composition in which a crosslinking agent, a crosslinking accelerator, zinc oxide, and the like have been added, and in the form of a polymer latex composition, may be used to form the polymer layer.

As the crosslinking agent, it is preferable to use a sulfur crosslinking agent. Examples of sulfur crosslinking agents include, but are not particularly limited to: sulfur, such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzo thiazyl disulfide, caprolactam disulfide (N,N'-dithio-bis(hexahydro-2H-azepinone-2)), phosphorus-containing polysulfide, and polymer polysulfide; sulfur donating compounds such as tetramethyl thiuram disulfide, selenium dimethyl dithiocarbamate, and 2-(4'-morpholinodithio)benzothiazole; and the like. These crosslinking agents may be used singly or in combinations of two or more.

The used amount of the sulfur crosslinking agent is preferably 0.01 to 5 parts by weight, more preferably 0.05 to 3 parts by weight, and particularly preferably 0.1 to 2 parts by weight, based on 100 parts by weight of the total solid content in the polymer latex. By setting the added amount of the sulfur crosslinking agent to be in the above range, the solvent resistance of the obtained laminated body can be improved, and the texture of the obtained laminated body when used as a protective glove can be improved.

It is preferable to add the sulfur crosslinking agent as a dispersion in which the sulfur crosslinking agent is dispersed in a solvent. By adding to the polymer latex as a dispersion, a laminated body can be obtained that has few defects such as cracks, generation of pinholes, and adhered agglomerates in the obtained polymer layer.

The method of preparing the dispersion of the sulfur crosslinking agent is not particularly limited, but a method in which a solvent is added to the sulfur crosslinking agent and the resultant mixture is pulverized and stirred with a wet pulverizer, such as a ball mill or a bead mill, is preferable.

When sulfur is used as the sulfur crosslinking agent, it is preferable to use together with a crosslinking accelerator (vulcanization accelerator) or zinc oxide.

Examples of the crosslinking accelerator (vulcanization accelerator) include, but are not particularly limited to: dithiocarbamines and zinc salts thereof, such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, and dibenzyl dithiocarbamic acid; 2-mercaptobenzothiazole, 2-mercaptobenzothiazole zinc, 2-mercaptothiazoline, dibenzothiazyl disulfide, 2-(2,4-dinitrophenylthio)benzothiazole, 2-(N,N-diethylthiocarbamoylthio)benzothiazole, 2-(2,6-dimethyl-4-morpholinothio)benzothiazole, 2-(4'-morpholino-dithio)benzothiazole, 4-morpholinyl-2-benzothiazyl-disulfide, 1,3-bis(2-benzothiazyl-mercaptomethyl) urea, and the like. Among these, zinc diethyl dithiocarbamate, zinc dibutyl dithiocarbamate, 2-mercaptobenzothiazole, and zinc 2-mercaptobenzothiazole are preferable. These crosslinking accelerators may be used singly or in combinations of two or more.

The used amount of the crosslinking accelerator is preferably 0.1 to 10 parts by weight, and more preferably 0.5 to 5 parts by weight, based on 100 parts by weight of the total solid content in the polymer latex.

The used amount of zinc oxide is preferably 5 parts by weight or less, more preferably 0.1 to 3 parts by weight, and even more preferably 0.5 to 2 parts by weight, based on 100 parts by weight of the total solid content in the polymer latex.

In the case of using a polymer latex in which a crosslinking agent has been added, a polymer latex aged in advance (also referred to as prevulcanized) may be used.

The viscosity of the polymer latex, which is a viscosity measured at a rotational speed of 10 rpm using a B-type viscometer at a temperature of 25° C. and a solid concentration of 45% by weight, is preferably 600 to 25,000 mPa·s, more preferably 800 to 20,000 mPa·s, even more preferably 900 to 15,000 mPa·s, and particularly preferably 1,000 to 12,000 mPa·s. By setting the viscosity of the polymer latex in the above range, the occurrence of pass through, in which the formed polymer layer reaches the bottom surface of the fiber substrate, can be more effectively prevented, and the polymer layer can be formed more appropriately. As a result, when the resulting laminated body is used as a protective glove, an excellent balance between durability (such as peeling resistance and cutting resistance of the polymer layer) and flexibility can be obtained.

The method of setting the viscosity of the polymer latex in the above range is not particularly limited, but it is preferable to use, for example, a method of adding a thickener to the polymer latex. Examples of the thickener include, but are not particularly limited to, vinyl compounds such as a polyvinyl alcohol and polyvinyl pyrrolidone; cellulose derivatives such as hydroxyethyl cellulose, hydroxypropyl cellulose, and carboxymethyl cellulose salts; polycarboxylic acid compounds and sodium salts thereof; polyoxyethylene derivatives such as polyethylene glycol ether; and the like. Among these, nonionic water-soluble polymers are preferable, and a polyvinyl alcohol and polyvinyl pyrrolidone are particularly preferable.

When a nonionic water-soluble polymer is added as a thickener to the polymer latex, the content ratio of the nonionic water-soluble polymer in the polymer latex is preferably 0.1 to 5.0 wt %. By setting the content ratio of the nonionic water-soluble polymer in the above range, the viscosity of the polymer latex can be made more appropriate.

The method for adding the thickener to the polymer latex is not particularly limited, but in the case of using a polymer latex in which a crosslinking agent has been added, from the viewpoint of preventing generation of aggregates in the polymer latex and enabling better transfer of the polymer latex, it is preferable to use a method in which a part of the thickener is added before aging the polymer latex, and then the remaining part of the thickener is added after the aging (split addition method), or a method in which the thickener is added after aging of the polymer latex. Of these methods, the split addition method is particularly preferable.

A filler may be added to the polymer latex, such as carbon black, silica, calcium carbonate, aluminum silicate, magnesium silicate, calcium silicate, magnesium oxide, zinc (meth)acrylate, and magnesium (meth)acrylate. However, from the viewpoint of further improving the cutting resistance when the obtained laminated body is used as a protective glove, it is preferable not to add these fillers to the polymer latex.

Optionally, a predetermined amount of various additives, such as an anti-aging agent, an antioxidant, a preservative, an antibacterial agent, a wetting agent, a thickener, a dispersant, a pigment, a dye, a filler, a reinforcing material, and a pH regulator, can also be added to the polymer latex.

In the case of a polymer latex to which a crosslinking agent has been added, the solid content concentration thereof is preferably 25 to 55% by weight, and more preferably 35 to 55% by weight. The surface tension of the polymer latex in which a crosslinking agent has been added is preferably 25 to 40 mN/m.

Next, the coagulant solution used in the present invention will be described.

The coagulant solution used in the present invention is obtained by dissolving or dispersing a coagulant in a solvent.

The coagulant is not particularly limited as long as it is capable of causing the polymer in the polymer latex to coagulate, and a metal salt or the like may be used, for example. Examples of the metal species constituting the metal salt include, but are not particularly limited to: monovalent metals such as lithium, sodium, and potassium; divalent metals such as magnesium, calcium, zinc, iron, barium, zirconium, and copper; trivalent metals such as aluminum; and the like. Examples of the salt species constituting the metal salt include, but are not particularly limited to: nitrate, sulfate, organic acid salts such as acetate; and the like. Among these, as the metal species, polyvalent metals are preferable, divalent metals are more preferable, and calcium is particularly preferable. As the salt species, nitrate or chlorine is preferable, and nitrate is particularly preferable. In other words, the metal salt is preferably a polyvalent metal salt, and more preferably a divalent metal nitrate or a halogenated salt.

Specific examples of these metal salts include: nitrates such as calcium nitrate, barium nitrate, and zinc nitrate; metal halide salts such as barium chloride, calcium chloride, magnesium chloride, zinc chloride, and aluminum chloride; acetates such as barium acetate, calcium acetate, and zinc acetate; sulfates such as calcium sulfate, magnesium sulfate, and aluminum sulfate; and the like. Among these, nitrates and metal halide salts are preferable, calcium nitrate and calcium chloride are more preferable, and calcium nitrate is particularly preferable.

These metal salts can be used singly or in combinations of two or more.

The coagulant solution may further contain an organic acid in addition to the above-mentioned coagulant. The organic acid is not particularly limited, but is preferably an organic acid having at least one group selected from a carboxyl group, a sulfo group, a hydroxy group, and a thiol group. Specific examples include acetic acid, formic acid, propionic acid, citric acid, oxalic acid, and the like. Among these, acetic acid is preferable.

The solvent for dissolving or dispersing the coagulant and the organic acid is not particularly limited, but water, an alcohol such as methanol and ethanol, or a mixture thereof, and the like can be used. Among these, water is particularly preferable.

The concentration of the coagulant in the coagulant solution is usually 5 to 50% by weight, and preferably 1 to 30% by weight.

The laminated body of the present invention can be obtained by, for example, as described above, depositing the polymer latex on the fiber substrate, then bringing the coagulant solution into contact with the polymer latex deposited on the fiber substrate to coagulate the polymer in the polymer latex, to thereby form the polymer layer. In this case, a portion of the polymer latex deposited on the fiber substrate permeates among the fibers constituting the fiber substrate. In this state, if the coagulant solution is brought into contact with the polymer latex, as shown in FIGS. 1(A) and 1(B), a polymer layer is formed on a top surface of the fiber substrate and a portion of the polymer layer permeates as far as gaps in the fibers constituting the fiber substrate. FIGS. 1(A) and 1(B) are schematic diagrams of the fiber substrate and the laminated body, respectively. FIG. 1(A) shows a cross-sectional view of the fiber substrate, and FIG. 1(B) shows a cross-sectional view of a laminated body in which a polymer layer is laminated on the fiber substrate shown in FIG. 1(A). In the laminated body shown in FIG. 1(B), the polymer layer covers the fiber substrate in a state in which a portion of the polymer layer has permeated among the fibers constituting the fiber substrate. In FIG. 1(B), of the polymer layer constituting the laminated body, the portion permeated from the top surface of the fiber substrate into the gaps among the fibers is referred to as a permeated polymer layer, and of the polymer layer, the portion covering the fiber substrate from the top surface of the fiber substrate is referred to as a top surface polymer layer. Note that, in the present invention, the polymer layer is described as being composed of a permeated polymer layer and a top surface polymer layer as appropriate, but in general, the permeated polymer layer and top surface polymer layer are formed as one body.

The laminated body of the present invention can be, for example, used as a protective glove, but it is not particularly limited to such a use. In the case of using the laminated body of the present invention as a protective glove, the fiber substrate is not particularly limited, and for example a single-fiber twisted yarn may be used as the fiber, and a woven product having a glove shape obtained by weaving such a twisted yarn can be used. In this case, a protective glove can be obtained by forming the polymer layer on the glove-shaped fiber substrate.

In the laminated body of the present invention, of the polymer layer constituting the laminated body, when the thickness of the portion that permeated into the fibers, that is, the thickness of the permeated polymer layer from the top surface of the fiber substrate shown in FIG. 1 is $t_1$ (units in μm), and the substrate layer average thickness of the fiber substrate is d (units in μm), a ratio ($t_1/d$) of the thickness of the permeated polymer layer $t_1$ to the substrate layer average thickness d is 0.1 to 0.95, preferably 0.1 to 0.9, more preferably 0.15 to 0.8, even more preferably 0.15 to 0.4, and particularly preferably 0.15 to 0.35. According to the present invention, by setting the ratio ($t_1/d$) of the thickness of the permeated polymer layer $t_1$ to the substrate layer average thickness d in the above range, when the obtained laminated body is used as a protective glove, the occurrence of pass through, in which the polymer layer reaches the bottom surface of the fiber substrate, can be prevented. As a result, a reduction in productivity of the protective glove caused by pass through (e.g., a reduction in productivity caused by, when forming the polymer layer by depositing the polymer latex on a glove-shaped fiber substrate in a state in which the substrate is covering a glove mold, the polymer latex being deposited on the glove mold due to pass through, making it difficult to remove the obtained protective glove from the glove mold), can be prevented, and an excellent balance among durability, flexibility, and comfort when worn of the obtained protective glove can be achieved. When the ratio ($t_1/d$) of the thickness of the permeated polymer layer $t_1$ to the substrate layer average thickness d is too small, that is, the thickness of the permeated polymer layer $t_1$ is too thin relative to the substrate layer average thickness d, when the obtained laminated body is used as a protected glove, the polymer layer tends to peel off, which reduces durability. On the other hand, when the ratio ($t_1/d$) of the thickness of the permeated polymer layer $t_1$ to the substrate layer average thickness d is too large, that is, the thickness of the permeated polymer layer $t_1$ is too thick with respect to the substrate layer average thickness d, when the obtained laminated body is used as a protective glove, the flexibility is reduced.

Further, in the laminated body of the present invention, the ratio ($t_1/d$) of the thickness of the permeated polymer layer $t_1$ to the substrate layer average thickness d may be in the above range, but it is preferable that the thickness of the permeated polymer layer $t_1$ itself to be 50 to 600 μm, more preferably 100 to 550 μm, even more preferably 120 to 500 μm, and particularly preferably 120 to 250 μm. By setting the thickness of the permeated polymer layer $t_1$ in the above range, when the obtained laminated body is used as a protective glove, the durability is further improved.

In addition, in the laminated body of the present invention, of the polymer layer, the thickness of the portion covering the top surface of the fiber substrate, that is, the thickness of the top surface polymer layer $t_2$ shown in FIG. 1 is 80 μm or more, preferably 100 μm or more, and more preferably 180 μm or more. By setting the thickness of the top surface polymer layer $t_2$ to be in the above range, in the case of using the obtained laminated body as a protective glove, durability is further improved. The upper limit of the thickness of the top surface polymer layer $t_2$ is not particularly limited, but is preferably 1,000 μm or less, more preferably 800 μm or less, and even more preferably 600 μm or less.

The ratio between the thickness of the permeated polymer layer and the thickness of the top surface polymer layer in the polymer layer is not particularly limited. When expressed as the ratio ($t_2/t_1$) of the thickness of the permeated polymer layer $t_1$ to the thickness of the top surface polymer layer $t_2$, this ratio is preferably 0.2 to 5, more preferably 0.3 to 4, even more preferably 0.8 to 4, and particular preferably 1 to 2. By setting the ratio of the thickness of the permeated polymer layer to the thickness of the top surface polymer layer in the above range, an excellent balance between durability and flexibility can be achieved when the obtained laminated body is used as a protective glove.

The entire thickness of the polymer layer, that is, the total of the thickness of the permeated polymer layer $t_1$ and the thickness of the top surface polymer layer $t_2$, is not particularly limited, but is preferably 150 μm or more.

As described above, the laminated body of the present invention is controlled such that the ratio ($t_1/d$) of the thickness of the permeated polymer layer $t_1$ to the substrate layer average thickness d, and the thickness of the top surface polymer layer $t_2$ [μm] are each in the above-mentioned ranges. As a result, an excellent balance is achieved between durability and flexibility, and the laminated body can be suitably used as a work glove, in particular as a protective glove such as for household, agricultural, fishery, and industrial use, for example.

Next, a method of producing the laminated body of the present invention is described.

The production method of the present invention comprises a latex deposition step of depositing the polymer latex on the fiber substrate, and a coagulation step of forming the polymer layer by bringing a coagulant solution into contact with the polymer latex deposited on the fiber substrate to cause a polymer in the polymer latex to coagulate. In the production method of the present invention, when depositing the polymer latex on the fiber substrate, the polymer latex is deposited on the fiber substrate in a state in which a viscosity of the polymer latex is controlled in a range of 600 to 25,000 mPa·s under conditions of a rotational speed of 10 rpm measured using a B-type viscometer. The viscosity of the polymer latex in this process is more preferably 800 to 20,000 mPa·s, even more preferably 900 to 15,000 mPa·s, and particularly preferably 1,000 to 12,000 mPa·s. Moreover, when depositing the polymer latex on the fiber substrate, the temperature and the solid content concentration of the polymer latex are not particularly limited. The polymer latex may be deposited on the fiber substrate in a state in which the viscosity at a rotational speed of 10 rpm measured using a B-type viscometer is controlled to be in the abovementioned range, but it is preferable that the polymer latex be deposited on the fiber substrate in a state controlled to a temperature of 20 to 40° C. and a solid content concentration of 30 to 50% by weight, and in particular to a temperature of 25° C. and a solid content concentration of 45% by weight.

According to the production method of the present invention, by depositing the polymer latex on the fiber substrate in a state in which the viscosity has been adjusted to the above range, when depositing the polymer latex on the fiber substrate, the rate with which the polymer latex permeates among the fibers can appropriately set, which allows the polymer latex to appropriately permeate among the fibers of the fiber substrate without passing through. As a result, in a state in which the polymer latex has appropriately permeated into the fiber substrate, the coagulant solution can be brought into contact with the polymer latex deposited on the fiber substrate, which enables the polymer in the polymer latex to coagulate and form a polymer layer with a portion of the polymer latex appropriately permeated into the fiber substrate. Additionally, in the obtained laminated body, the ratio ($t_1/d$) of the thickness of the permeated polymer layer $t_1$ to the substrate layer average thickness d of the fiber substrate can be controlled to be in the above range. Therefore, when the obtained laminated body is used as a protective glove, such as a work glove, flexibility and durability are excellent.

As the method of adjusting the viscosity of the polymer latex to be in the above range, as described above, a method of adding a thickener to the polymer latex can be used. As the method of adding the thickener, in the case of using a polymer latex in which a crosslinking agent has been added, from the viewpoint of preventing generation of aggregates in the polymer latex and enabling better transfer of the polymer latex, it is preferable to use a method in which the addition of the thickener is split between before and after aging the polymer latex, or a method in which the thickener is added after aging of the polymer latex The temperature condition for the aging of the polymer latex is not particularly limited, but is preferably 20 to 50° C. Further, from the viewpoint of preventing peeling between the fiber substrate and the polymer layer, from the viewpoint of improving durability when the obtained laminated body is used as a protective glove, and from the viewpoint of suppressing passage of solvent gas in the case where the protective glove is used as a work glove, the aging time is preferably 4 hours or more and 120 hours or less, and more preferably 24 hours or more and 72 hours or less. By setting the aging time to within the above range, the polymer layer permeates into the fiber substrate to a suitable thickness, which more effectively prevents peeling between the fiber substrate and the polymer layer, further improves the durability of the obtained laminated body, and more effectively suppresses passage of solvent gas when the laminated body is used as a protective glove.

The method of depositing the polymer latex on the fiber substrate is not particularly limited, and examples thereof include a method in which the fiber substrate is dipped in the polymer latex and the like.

Note that, when depositing the polymer latex on the fiber substrate, it is preferable to dip the fiber substrate in the polymer latex in a state in which the fiber substrate has been made to cover a molding die having a desired shape in advance.

The mold for covering the fiber substrate is not particularly limited, but various materials may be used, such as porcelain, glass, metal, and plastic. As the shape of the molding die, a desired shape may be selected according to the shape of the final product. For example, when the laminated body is to be used as a protective glove, it is preferable to use a molding die for various gloves, such as a molding die having a shape from the wrist to the fingertip, as the molding die for covering the fiber substrate.

In the production method of the present invention, it is preferable to dry the polymer latex after depositing the polymer latex on the fiber substrate. The drying temperature at this stage is not particularly limited, but it is preferably 180° C. or less, and more preferably 10 to 170° C. The drying time is not particularly limited, but is preferably 1 second to 60 minutes, and more preferably 3 seconds to 30 minutes.

Next, the coagulant solution is brought into contact with the polymer latex deposited on the fiber substrate to coagulate the polymer in the polymer latex and form the polymer layer.

Examples of the method of bringing the coagulant solution into contact with the polymer latex deposited on the fiber substrate include, but are not particularly limited to, a method of dipping the fiber substrate having the polymer latex deposited thereon in the coagulant solution.

In addition, when dipping the fiber substrate on which the polymer latex is deposited in the coagulant solution, it is preferable to dip the fiber substrate on which the polymer latex is deposited in the coagulant solution in a state in which the fiber substrate is covering a molding die having a desired shape. At this time, the polymer latex is deposited on the fiber substrate as described above in a state in which the fiber substrate covers a molding die having a desired shape in advance, and then the fiber substrate on which the polymer latex is deposited is dipped in the coagulant solution while still covering the mold.

The dipping time in the case of dipping the fiber substrate in the coagulant solution is not particularly limited, but is preferably 30 seconds to 1 second, and more preferably 10 seconds to 1 second.

Further, in the production method of the present invention, it is preferable to remove the solvent included in the coagulant solution by drying the fiber substrate after bringing the coagulant solution into contact with and depositing it on the polymer latex deposited on the fiber substrate. The drying temperature at this time is not particularly limited, and may be selected according to the solvent to be used, but is preferably 10 to 80° C., and more preferably 15 to 70° C. The drying time is not particularly limited, but is preferably 600 to 1 second, and more preferably 300 to 5 seconds.

Further, when using a polymer latex in which a crosslinking agent is added, it is preferable to bring the fiber substrate on which the polymer latex is deposited into contact with the coagulant solution, and then heat the polymer latex deposited on fiber substrate to crosslink the polymer constituting the polymer latex.

The heating temperature for crosslinking is preferably 60 to 160° C., and more preferably 80 to 150° C. By setting the heating temperature to within the above range, the productivity of the laminated body can be improved by shortening the time required for the crosslinking reaction, and the physical properties of the obtained laminated body can be improved by suppressing oxidative degradation of the polymer due to excessive heating. The heating time for crosslinking may be appropriately selected according to the heating temperature, and it is usually 5 to 120 minutes.

In the production method of the present invention, as described above, a laminated body having a polymer layer formed on a fiber substrate is obtained.

Note that in the production method of the present invention, after the polymer layer is formed on the fiber substrate, it is preferable to remove water-soluble impurities (emulsifier, water-soluble polymers, coagulant, and the like) from the polymer layer by dipping the polymer layer in warm water of 20 to 80° C. for about 0.5 to 60 minutes.

In addition, when the polymer layer is formed in a state in which the fiber substrate is covering the molding die, the laminated body can be obtained by removing the fiber substrate on which the polymer layer is formed from the molding die. As the removal method, a method of peeling from the molding die by hand or peeling by water pressure or compressed air can be employed.

After the laminated body is removed from the molding die, a heat treatment (post-crosslinking step) may be further performed at a temperature of 60 to 120° C. for 10 to 120 minutes. Further, a surface-treated layer may be formed on the inner side and/or outer side top surface of the laminated body by a chlorination treatment, a coating treatment, or the like.

According to the production method of the present invention, after the polymer latex is deposited on the fiber substrate as described above, the coagulant solution is brought into contact with the polymer latex deposited on the fiber substrate to coagulate the polymer in the polymer latex with an appropriate level of permeation by the polymer latex among the fibers of the fiber substrate without passing through, whereby a laminated body in which a polymer layer is formed on the fiber substrate is obtained. Therefore, according to the production method of the present invention, pass through of the polymer layer during production of the laminated body can be prevented more effectively, the occurrence of defects due to pass through is suppressed, and laminated body productivity can be further improved. In addition, the prevention of pass through of the polymer layer further improves comfort when the obtained protective glove is actually worn.

Conventionally, as a method of producing a laminated body, there is known a method in which a laminated body is obtained by first dipping a fiber substrate in a coagulant solution and then depositing a polymer latex on the fiber substrate. However, in this method, by dipping the fiber substrate in the coagulant solution, the fiber substrate may come into excessive contact with the coagulant solution, causing the fiber substrate to degrade. To suppress such degradation of the fiber substrate, the type of fiber substrate that can be used and the type of coagulant have been limited. On the other hand, in the production method of the present invention, the polymer latex is first deposited on the fiber substrate and then the coagulant solution is brought into contact with the polymer latex deposited on the fiber substrate, and therefore the fiber substrate does not come into excessive contact with the coagulant solution. As a result, a larger number of types of fiber substrates and coagulants can be employed.

Moreover, the laminated body obtained by the production method of the present invention is in a state in which, as shown in FIG. 1, a portion of the polymer layer has appropriately permeated into the fiber substrate, and as a result, an excellent balance is achieved between durability and flexibility, and the laminated body can be suitably used as a work glove, in particular as a protective glove such as for household, agricultural, fishery, and industrial use, for example.

EXAMPLES

Hereinafter, the present invention will be described more specifically with reference to Examples and Comparative Examples, but the present invention is not limited to these examples. In the following, unless stated otherwise, the term "parts" is based on weight. The test or evaluation methods of the physical properties and characteristics are as follows.

Thickness of Permeated Polymer Layer $t_1$ and Thickness of Top Surface Polymer Layer $t_2$ The thickness of the permeated polymer layer $t_1$ and the thickness of the top surface polymer layer $t_2$ were measured by observing a cross-section of the laminated polymer layer of a 12 cm palm portion from the tip of the middle finger in the laminated bodies produced in the Examples and Comparative Examples was observed using an optical microscope (VHX-200, manufactured by Keyence Corporation). Describing the specific measurement method with reference to FIG. 1, the thickness of the permeated polymer layer $t_1$ was determined by measuring the distance from the top surface of the fiber substrate to the deepest portion of the permeated polymer at ten places, and calculating the number average value of the measurement results. Further, the thickness of the top surface polymer layer $t_2$ was determined by measuring the distance from the top surface of the fiber substrate to the top surface of the polymer layer at ten places, and calculating the number average value of the measurement results.

Release Properties

The laminated bodies produced in the Examples and the Comparative Examples were evaluated according to the following criteria regarding how easily the laminated body could be removed from the metal glove mold during production.
  3: Removable within 10 seconds.
  2: Removable within 5 minutes.
  1: Could not be removed.

Pass Through

The laminated bodies produced in the Examples and Comparative Examples were visually observed to confirm whether or not the polymer layer permeated into the fiber substrate had reached the bottom surface of the fiber substrate, and pass through was evaluated according to the following criteria.
  3: The surface area of the polymer layer reaching the bottom surface was 5% or less of the entire bottom surface.
  2: The surface area of the polymer layer reaching the bottom surface was more than 5% but less than 20% of the entire bottom surface.
  1: The surface area of the polymer layer reaching the bottom surface was 20% or more of the entire bottom surface.

Durability (Peeling Resistance)

The durability (peeling resistance) of the laminated bodies produced in the Examples and Comparative Examples was evaluated according to the following criteria by intentionally peeling off the polymer layer and the fiber substrate.
  2: The polymer layer and the fiber substrate could not be easily peeled off manually, or, even if peeling was possible, the polymer layer and the fiber substrate could not be separated.
  1: The polymer layer and the fiber substrate could be easily peeled off manually, and the polymer layer and the fiber substrate could be separated.

Durability (Cutting Resistance)

The durability (peeling resistance) of the laminated bodies produced in the Examples and Comparative Examples was evaluated according to the following criteria by horizontally pressing a 3 cm-long, unused cutter blade against the polymer layer side of the laminated body for 3 seconds with a force of 2.5 kgf, and then visually observing the section that the cutter blade pressed against.
  2: A portion of the polymer layer remained uncut.
  1: All of the polymer layer was cut.

Flexibility

Each glove produced in the Examples and Comparative Examples was worn by ten people and evaluated according to the following evaluation criteria.
  3: Soft
  2: Hard
  1: Very hard

Example 1

Preparation of Latex Composition for Dip Molding

A latex of a nitrile rubber (a1) (trade name "Nipol LX550L", manufactured by Zeon Corporation, a latex of a nitrile rubber containing an acrylonitrile unit, a 1,3-butadiene unit, and an ethylenically unsaturated acid monomer unit) was prepared as a polymer latex. An aqueous dispersion of the respective blending agents was prepared and added to 100 parts of the nitrile rubber in the latex of the nitrile rubber (a1) such that, in terms of the solid content of each blending agent, 1.0 part of colloidal sulfur (manufactured by Hosoi Chemical Industry Co., Ltd.), 0.5 parts of zinc dibutyldithiocarbamate (manufactured by Ouchi Shinko Chemical Industrial Co., Ltd.), and 2.0 parts by weight of zinc oxide were added, to thereby obtain a latex composition. Note that during the addition, a predetermined amount of the aqueous dispersion of the respective blending agents was slowly added while stirring the latex. The solid concentration of the latex composition was subsequently adjusted, 0.2% by weight of polyvinyl alcohol (PVA) was added as a thickener to the latex composition, and then aging (also referred to as prevulcanizing) was carried out at a temperature of 30° C. for 48 hours. Then, 0.18% by weight of polyvinyl alcohol was further added as a thickener to the aged latex composition to obtain a latex composition for dip molding having a solid content concentration of 45% by weight. The viscosity of the obtained latex composition for dip molding when measured t a temperature of 25° C. and a solid content concentration of 45% by weight at a rotation speed of 10 rpm with a B-type viscometer was 10,000 mPa·s.

Preparation of Coagulant Solution

A coagulant solution was obtained by mixing 20 parts of calcium nitrate and 80 parts of water.

Production of Laminated Body (Protective Glove)

The latex composition for dip molding obtained above was adjusted to 25° C. Next, a metal glove mold covered with a glove-shaped fiber substrate (material: cotton, substrate layer average thickness d of fiber substrate: 650 μm, linear density: 300 denier) was dipped for 5 seconds in the latex composition for dip molding that had been adjusted to 25° C. The metal glove mold was pulled from the latex composition for dip molding, and then dried at a temperature of 30° C. for 30 minutes. Then, the metal glove mold was dipped in the above coagulant solution for 5 seconds, pulled from the coagulant solution, and dried at a temperature of 30° C. for 1 minute to form a polymer layer on the fiber substrate. The nitrile rubber in the polymer layer was then crosslinked by performing a heat treatment at 125° C. for 60 minutes. Next, a laminated body (protective glove) was obtained by peeling the fiber substrate having the polymer layer formed thereon from the metal glove mold. For the obtained laminated body, the thickness of the permeated polymer layer $t_1$ and the thickness of the top surface polymer layer $t_2$ were measured, and the release properties, pass through, durability (peeling resistance), durability (cutting resistance), and flexibility were evaluated according to the methods described above. The results are shown in Table 1. Note that in Table 1, the results of calculating, based on the values of the thickness of the permeated polymer layer $t_1$ and the thickness of the top surface polymer layer $t_2$, the ratio of (thickness of permeated polymer layer $t_1$/substrate layer average thickness d) and the ratio of (thickness of top surface polymer layer $t_2$/thickness of permeated polymer layer $t_1$) are also shown (the same applies to Examples 2 to 7 and Comparative Examples 1 to 4 described below).

Example 2

A laminated body (protective glove) was obtained and evaluated in the same manner as in Example 1, except that the addition ratio of the thickener added before aging of the latex composition was changed to 0.2% by weight, the addition ratio of the thickener added after aging was changed to 0.1% by weight, and the viscosity of the latex composition for dip molding (viscosity at 25° C. and solid content concentration of 45% by weight) was adjusted to 5,400 mPa·s. The results are shown in Table 1.

Example 3

A laminated body (protective glove) was obtained and evaluated in the same manner as in Example 2, except that the addition ratio of the thickener added before aging of the latex composition was changed to 0.15% by weight, the addition ratio of the thickener added after aging was changed to 0.05% by weight, and the viscosity of the latex composition for dip molding (viscosity at 25° C. and solid content concentration of 45% by weight) was adjusted to 1,200 mPa·s. The results are shown in Table 1.

Example 4

A laminated body (protective glove) was obtained and evaluated in the same manner as in Example 2, except that polyvinyl pyrrolidone (PVP) was used as a thickener instead of polyvinyl alcohol (PVA), and the addition ratio of the thickener added before aging of the latex composition was changed to 0.2% by weight, the addition ratio of the thickener added after aging was changed to 0.5% by weight, and the viscosity of the latex composition for dip molding (viscosity at 25° C. and solid content concentration of 45% by weight) was adjusted to 2,500 mPa·s. The results are shown in Table 1.

Comparative Example 1

A laminated body (protective glove) was obtained and evaluated in the same manner as in Example 1, except that carboxymethyl cellulose (CMC) was used as a thickener instead of polyvinyl alcohol (PVA), and the addition ratio of the thickener added before aging of the latex composition was changed to 0.2% by weight, the addition ratio of the thickener added after aging was changed to 0.4% by weight, and the viscosity of the latex composition for dip molding (viscosity at 25° C. and solid content concentration of 45% by weight) was adjusted to 5,500 mPa·s. The results are shown in Table 1.

Comparative Example 2

A laminated body (protective glove) was obtained and evaluated in the same manner as in Example 1, except that sodium polyacrylate (PAA) was used as a thickener instead of polyvinyl alcohol (PVA), and the addition ratio of the thickener added before aging of the latex composition was changed to 0.05% by weight, the addition ratio of the thickener added after aging was changed to 0.1% by weight, and the viscosity of the latex composition for dip molding (viscosity at 25° C. and solid content concentration of 45% by weight) was adjusted to 5,800 mPa·s. The results are shown in Table 1.

Comparative Example 3

The same fiber substrate as that used in Example 1 was prepared. A metal glove mold covered with the prepared fiber substrate was dipped in the above coagulant solution for 5 seconds, pulled from the coagulant solution, and dried at a temperature of 30° C. for 1 minute. Then, the metal glove mold was dipped for 5 seconds in the same latex composition for dip molding as used in Example 1, pulled from the latex composition for dip molding, and then dried at a temperature of 30° C. for 30 minutes to form a polymer layer on the fiber substrate. The nitrile rubber in the polymer layer was then crosslinked by performing a heat treatment at 125° C. for 60 minutes. Next, a laminated body (protective glove) was obtained by peeling the fiber substrate having the polymer layer formed thereon from the metal glove mold. The obtained laminated body was evaluated in the same manner as in Example 1. The results are shown in Table 1.

Comparative Example 4

A laminated body (protective glove) was obtained and evaluated in the same manner as in Example 2, except that the addition ratio of the thickener added before aging of the latex composition was changed to 0.05% by weight, the addition ratio of the thickener added after aging was changed to 0.02% by weight, and the viscosity of the latex composition for dip molding (viscosity at 25° C. and solid content concentration of 45% by weight) was adjusted to 500 mPa·s. The results are shown in Table 1.

TABLE 1

|  |  | Example | | | | Comparative Example | | | |
|---|---|---|---|---|---|---|---|---|---|
|  |  | 1 | 2 | 3 | 4 | 1 | 2 | 3 | 4 |
| Latex Composition for Dip Molding |  |  |  |  |  |  |  |  |  |
| Type of Used Polymer Latex |  | latex of nitrile rubber (a1) | latex of nitrile rubber (a1) | latex of nitrile rubber (a1) | latex of nitrile rubber (a1) | latex of nitrile rubber (a1) | latex of nitrile rubber (a1) | latex of nitrile rubber (a1) | latex of nitrile rubber (a1) |
| Type of Used Thickener |  | PVA | PVA | PVA | PVP | CMC | PAA | PVA | PVA |
| Viscosity | (mPa·s) | 10,000 | 5,400 | 1,200 | 2,500 | 5,500 | 5,800 | 10,000 | 500 |
| Contact Timing of Coagulant Solution |  | after latex deposition | after latex deposition | after latex deposition | after latex deposition | after latex deposition | after latex deposition | before latex deposition | after latex deposition |
| Laminated Body (Protective Glove) |  |  |  |  |  |  |  |  |  |
| Substrate Layer Average Thickness d | (μm) | 650 | 650 | 650 | 650 | 650 | 650 | 650 | 650 |
| Thickness of Permeated Polymer Layer $t_1$ | (μm) | 130 | 180 | 170 | 170 | 800 | 700 | 27 | 240 |
| Thickness of Top Surface Polymer Layer $t_2$ | (μm) | 510 | 300 | 200 | 200 | 370 | 360 | 500 | 75 |
| Thickness of Permeated Polymer Layer $t_1$/ Substrate Layer Average Thickness d |  | 0.20 | 0.28 | 0.26 | 0.26 | 1.23 | 1.08 | 0.04 | 0.37 |
| Thickness of Top Surface Polymer Layer $t_2$/ Thickness of Permeated Polymer Layer $t_1$ |  | 3.9 | 1.7 | 1.2 | 1.2 | 0.5 | 0.5 | 18.5 | 0.3 |
| Evaluation |  |  |  |  |  |  |  |  |  |
| Release Properties |  | 3 | 3 | 3 | 3 | 1 | 1 | 3 | 2 |
| Pass Through |  | 3 | 3 | 3 | 3 | 1 | 1 | 3 | 2 |
| Durability (peeling resistance) |  | 2 | 2 | 2 | 2 | 2 | 2 | 1 | 2 |
| Durability (cutting resistance) |  | 2 | 2 | 2 | 2 | 2 | 2 | 1 | 1 |
| Flexibility |  | 3 | 3 | 3 | 3 | 2 | 1 | 3 | 3 |

As shown in Table 1, the laminated bodies having a ratio (thickness of permeated polymer layer $t_1$/substrate layer average thickness d) and a thickness of the top surface polymer layer $t_2$ controlled within the predetermined range of the present invention all exhibited good release property results, and hence had excellent productivity, and also exhibited good pass through results, and hence had excellent comfort during wearing. Further, those laminated bodies also had excellent durability and flexibility (Examples 1 to 4).

On the other hand, in cases where the ratio (thickness of permeated polymer layer $t_1$/substrate layer average thickness d) was too large, the resulting laminated body exhibited poor release property results, and hence had inferior productivity, and also exhibited poor pass through results, and hence had inferior comfort during wearing. Moreover, flexibility was also inferior (Comparative Examples 1 and 2).

In addition, in cases where the ratio (thickness of permeated polymer layer $t_1$/substrate layer average thickness d) was too small, the resulting laminated body had inferior durability (Comparative Example 3).

Furthermore, when the thickness of the top surface polymer layer $t_2$ was too thin, the resulting laminated body exhibited poor release property results, and hence had inferior productivity, and also exhibited poor pass through results, and hence had inferior comfort during wearing. Moreover, durability was also inferior (Comparative Example 4).

The invention claimed is:

1. A laminated body formed by laminating a fiber substrate composed of a plurality of fibers and a polymer layer formed from a polymer latex, wherein
the polymer layer covers the fiber substrate in a state in which a portion of the polymer layer has permeated among the fibers;
a ratio ($t_1$/d) of a thickness of a permeated polymer layer $t_1$ to a substrate layer average thickness d is 0.1 to 0.4, where the thickness of the permeated polymer layer of the polymer layer, which is a portion that has permeated among the fibers, from a top surface of the fiber substrate is set to $t_1$ [μm] and a substrate layer average thickness of the fiber substrate is set to d [μm];
the thickness of the permeated polymer layer $t_1$ is 50 to 600 μm;
a thickness of a top surface polymer layer $t_2$ [μm] is 180 μm or more, where the thickness of the top surface polymer layer of the polymer layer, which is a portion covering the top surface of the fiber substrate, from the top surface of the fiber substrate is set to $t_2$ [μm]; and a ratio ($t_2/t_1$) of the thickness of the top surface polymer layer $t_2$ to the thickness of the permeated polymer layer $t_1$ is 0.8 to 5.

2. The laminated body according to claim 1, wherein the polymer latex comprises a nonionic water-soluble polymer as a thickener.

3. The laminated body according to claim 2, wherein a content ratio of the nonionic water-soluble polymer in the polymer latex is 0.1 to 5.0% by weight.

4. The laminated body according to claim 2, wherein the nonionic water-soluble polymer is a polyvinyl alcohol and/or polyvinyl pyrrolidone.

5. The laminated body according to claim 1, wherein a polymer constituting the polymer latex is a nitrile rubber.

6. The laminated body according to claim 5, wherein the nitrile rubber contains an ethylenically unsaturated nitrile monomer unit, a conjugated diene monomer unit, and an ethylenically unsaturated acid monomer unit.

7. A protective glove comprising the laminated body according to claim 1.

8. The laminated body according to claim 1, wherein the ratio ($t_1/d$) is 0.15 to 0.35.

9. The laminated body according to claim 1, wherein $t_1$ is 100 to 550 μm.

10. The laminated body according to claim 1, wherein $t_1$ is 120 to 500 μm.

11. The laminated body according to claim 1, wherein $t_1$ is 120 to 250 μm.

12. The laminated body according to claim 1, wherein $t_2$ is 1000 μm or less.

13. The laminated body according to claim 1, wherein $t_2$ is 800 μm or less.

14. The laminated body according to claim 1, wherein $t_2$ is 600 μm or less.

15. A method of producing the laminated body according to claim 1, the method comprising:
   a latex deposition step of depositing the polymer latex on the fiber substrate; and
   a coagulation step of forming the polymer layer by bringing a coagulant solution into contact with the polymer latex deposited on the fiber substrate to cause a polymer in the polymer latex to coagulate,
   wherein when depositing the polymer latex on the fiber substrate, the polymer latex is deposited on the fiber substrate in a state in which a viscosity of the polymer latex is controlled in a range of 600 to 25,000 mPa·s, the viscosity being measured by using a B-type viscometer under conditions of a rotational speed of 10 rpm.

16. The method of producing the laminated body according to claim 15, wherein when depositing the polymer latex on the fiber substrate, the polymer latex is deposited on the fiber substrate in a state in which the viscosity of the polymer latex is controlled to 600 to 25,000 mPa·s, the viscosity being measured by using a B-type viscometer under conditions of a temperature of 25° C., a solid content concentration of 45% by weight, and a rotational speed of 10 rpm.

* * * * *